(12) United States Patent
Sturt et al.

(10) Patent No.: US 7,370,898 B2
(45) Date of Patent: May 13, 2008

(54) CONSOLE ASSEMBLY FOR A VEHICLE

(75) Inventors: Alan Sturt, West Bloomfield, MI (US); Jason Gamache, Romeo, MI (US)

(73) Assignee: International Automotive Components Group North America, Inc.

( * ) Notice: Subject to any disclaimer, the term of this patent is extended or adjusted under 35 U.S.C. 154(b) by 0 days.

(21) Appl. No.: 11/426,393

(22) Filed: Jun. 26, 2006

(65) Prior Publication Data

US 2007/0296234 A1 Dec. 27, 2007

(51) Int. Cl.
*B60R 7/04* (2006.01)
(52) U.S. Cl. .................. 296/24.34; 296/37.8
(58) Field of Classification Search ............. 296/24.34, 296/37.8, 37.14, 1.09; 224/275, 400, 296
See application file for complete search history.

(56) References Cited

U.S. PATENT DOCUMENTS

| | | | |
|---|---|---|---|
| 5,085,481 A | 2/1992 | Fluharty et al. | |
| 6,135,529 A | 10/2000 | De Angelis et al. | |
| 6,203,088 B1 | 3/2001 | Fernandez et al. | |
| 6,250,729 B1 | 6/2001 | Allison et al. | |
| 6,264,261 B1 | 7/2001 | Krafcik | |
| 6,435,587 B1 | 8/2002 | Flowerday et al. | |
| 6,497,443 B2 | 12/2002 | Worrell et al. | |
| 6,547,299 B2 | 4/2003 | Atanasiu et al. | |
| 6,851,736 B1 * | 2/2005 | Klopp et al. | 296/37.8 |
| 6,921,118 B2 | 7/2005 | Clark et al. | |
| 7,029,048 B1 * | 4/2006 | Hicks et al. | 296/24.34 |
| 7,104,580 B2 * | 9/2006 | Clark et al. | 296/24.32 |
| 7,168,750 B2 * | 1/2007 | Hutek et al. | 296/37.8 |
| 2002/0175531 A1 | 11/2002 | Worrell et al. | |
| 2003/0122392 A1 | 7/2003 | Larsen et al. | |
| 2003/0155786 A1 * | 8/2003 | Kim et al. | 296/24.1 |
| 2005/0035618 A1 * | 2/2005 | Toth et al. | 296/24.34 |
| 2005/0082861 A1 * | 4/2005 | Kubota et al. | 296/24.34 |
| 2005/0206179 A1 * | 9/2005 | Chiku et al. | 296/24.34 |
| 2005/0225130 A1 * | 10/2005 | Kobayashi et al. | 297/188.07 |
| 2006/0261621 A1 * | 11/2006 | Sturt et al. | 296/37.8 |

* cited by examiner

*Primary Examiner*—Jason S. Morrow
(74) *Attorney, Agent, or Firm*—Brooks Kushman P.C.

(57) ABSTRACT

A console assembly for use in a passenger seating area of a vehicle includes a base securable to a floor of the passenger seating area and a support structure mounted to the vehicle floor cooperating with the base. One or more storage modules are disposed adjacent to the base and include or define a storage area to provide additional storage in the passenger seating area. One or more trays are pivotally connected to base adjacent the one or more storage modules and are movable between a first position extending generally parallel to the vehicle floor and at least one second position extending generally perpendicular to the floor.

20 Claims, 3 Drawing Sheets

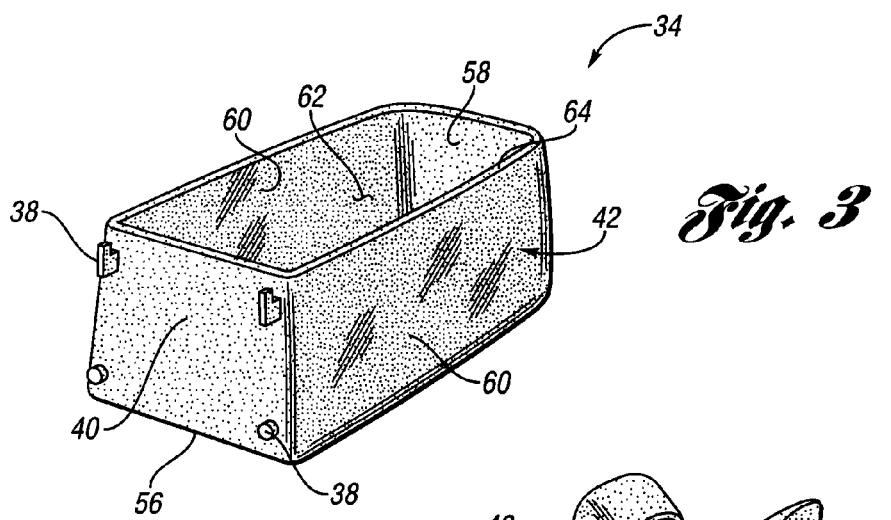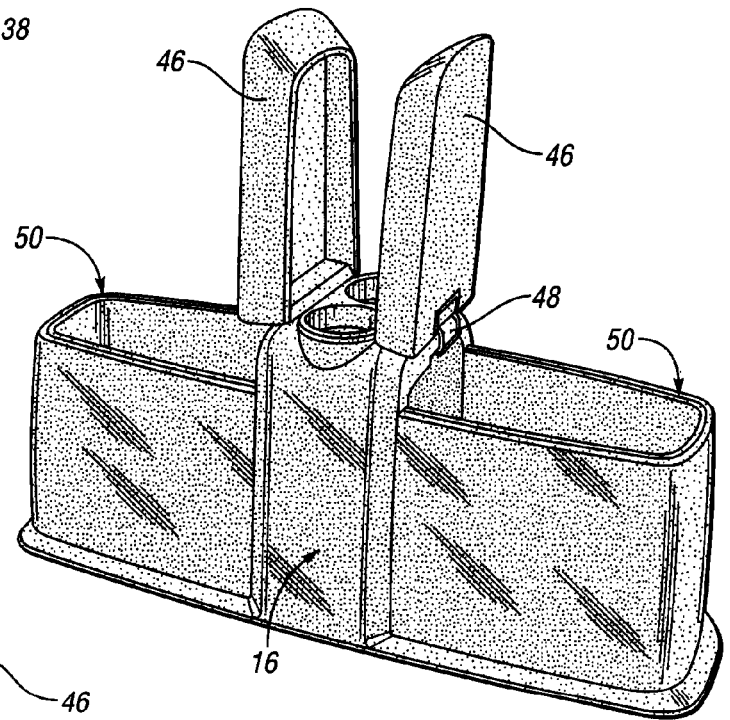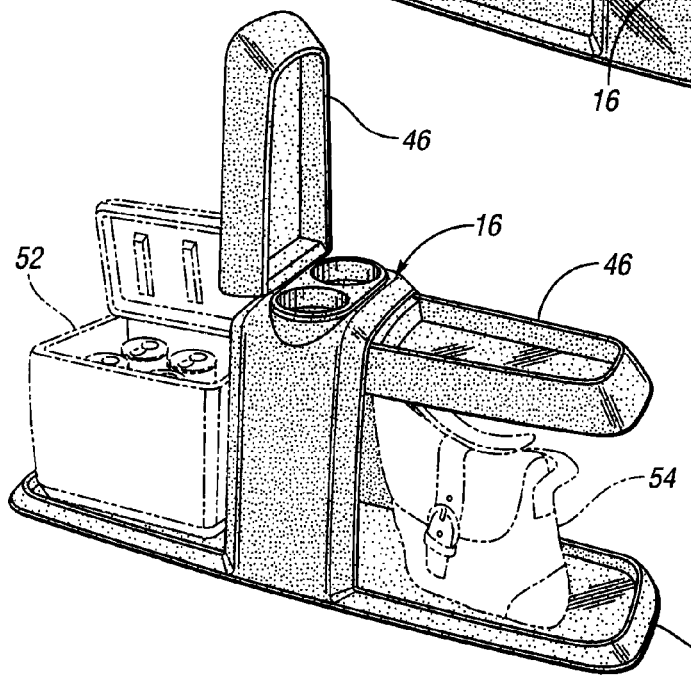

CONSOLE ASSEMBLY FOR A VEHICLE

BACKGROUND OF THE INVENTION

1. Field of the Invention

The present invention relates generally to a console assembly for a passenger seating area of a vehicle.

2. Background Art

Vehicle manufacturers continue to develop storage containers and devices for the passenger compartments of vehicles to accommodate occupant's personal items and automotive components. Several current storage containers are designed to fit within specified areas of the passenger compartment and allow limited access to items stored therein.

Many automotive vehicles include a center console or other storage device disposed between passenger seats in the front passenger compartment of the vehicle. Typically, the center console is disposed between the driver and passenger seats in a forward seating area of the vehicle. However, it is common in larger vehicles, such as sport utility vehicles and vans, to provide center consoles between the second and/or third row passenger seating areas.

These consoles typically comprise a console base that may be secured to the floor, releasably mounted to the floor or pivotally connected between the seats, a storage cavity formed in the console base to retain items during travel and an armrest pivotally connected to the console base extending generally horizontally across the storage cavity. One limitation of current console assemblies is that the storage area and occupant accessible portions of the console can sometimes be obscured or inaccessible to various portions of the passenger compartments.

It would be advantageous to provide a storage console assembly for a vehicle which offers a wide variety of storage options while allowing access to items stored therein to most occupants of the vehicle. It is also desirable to provide a console assembly having one or more reconfigurable modules for use throughout the vehicle seating area.

SUMMARY OF THE INVENTION

The present invention provides a console assembly for use in a passenger seating area of a vehicle. The console assembly comprises a base securable to a floor of the passenger seating area and a support structure mounted to the vehicle floor cooperating with the base. One or more storage modules are disposed adjacent to the base and include or define a storage area to provide additional storage in the passenger seating area. One or more trays are pivotally connected to base adjacent the one or more storage modules and are movable between a first position extending generally parallel to the vehicle floor and at least one second position extending generally perpendicular to the floor.

Other features and advantages of the present invention will be readily appreciated and better understood after reading the subsequent description when considered in connection with the accompanying drawings.

BRIEF DESCRIPTION OF THE DRAWINGS

FIG. 3 is a rear perspective view of a storage module for use in connection with the console assembly of the present invention;

FIG. 4 is a perspective view of one aspect of the console assembly of the present invention;

FIG. 5 is a perspective view of the pair of trays pivotally secured to the base of the console assembly;

DETAILED DESCRIPTION OF THE PREFERRED EMBODIMENT(S)

Figure 1:
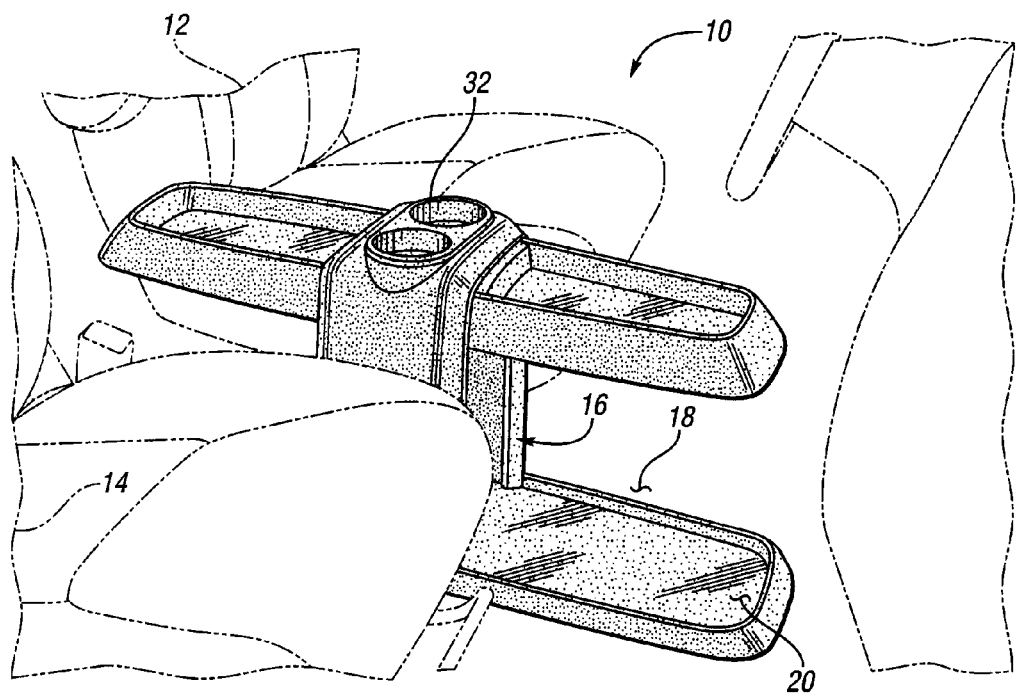
FIG. 1 is a perspective view of a console assembly for a passenger seating area of a vehicle in accordance with the present invention.

Referring now to the Figures, a console assembly for use in the passenger seating area of a motor vehicle in accordance with the present invention is disclosed. It is understood that the console assembly may be used in either the front or rear passenger seating areas. For purposes of this disclosure, the restraint system will be installed in a front passenger seating area between a pair of front passenger seats.

In the following description, various operating parameters and components are described for a number of constructed embodiments. These specific parameters and components are included as examples and are not meant to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring now to Figures, a console assembly 10 is disposed between a pair of passenger seats 12, 14 in the passenger compartment of the vehicle in accordance with the present invention. Passenger seats 12, 14 are shown to include bucket seats with the passenger side bucket seats being illustrated in phantom so as to provide a clear view of the console assembly 10. The present invention, however, contemplates the use of any number and type of seats, including bench seats, and is not intended to be limited to the non-limiting aspect of the present invention shown in the Figures.

Console assembly 10 includes a base 16 disposed adjacent to and securable to the floor 18 of the passenger compartment of the vehicle. It is understood that the base 16 may be configured for securement directly to the vehicle floor, or alternatively, to a support structure 20. It is also understood that the console assembly may be positioned anywhere within the passenger seating area of the vehicle. The base 16 is a structural support that may be formed by a variety of methods, including mechanical fastening of two or more mated components or a unitary structure formed by a known manufacturing process sufficient to support one or more items mounted thereon.

Figure 2:
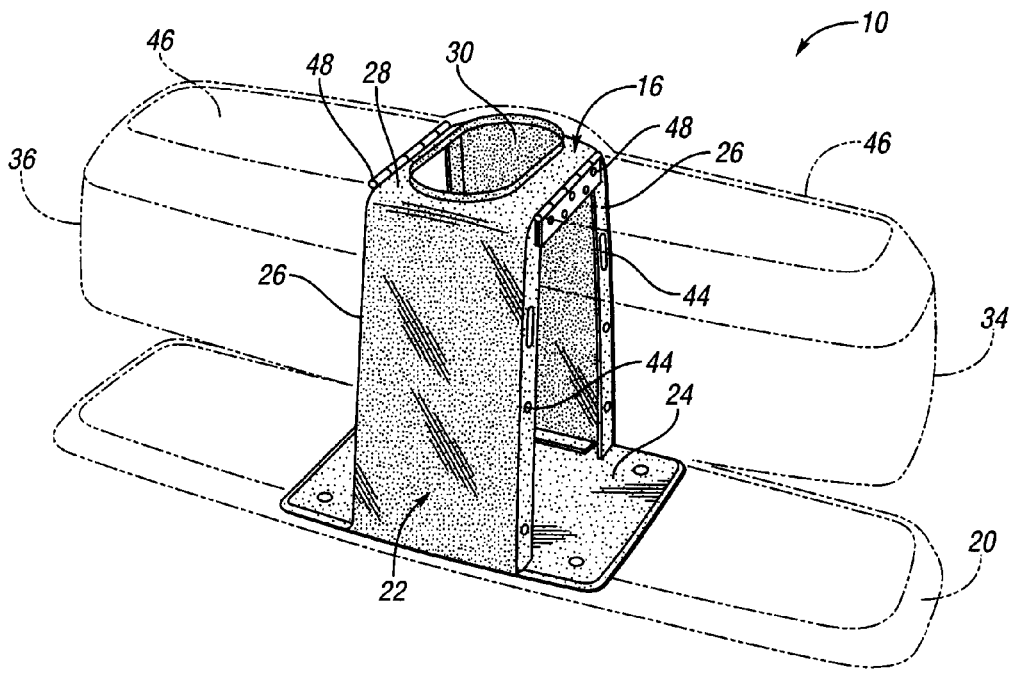
FIG. 2 is a fragmentary perspective view of the console assembly of the present invention.

As best shown in FIGS. 1 and 2, base 16 generally includes a housing 22 having a bottom surface 24 configured for securement to the floor of the vehicle, a pair of opposing side surfaces 26 and top surface 28. As shown in FIG. 2, the top surface 28 of the base 16 includes an opening 30 sized to receive one or more accessory modules, such as a cup holder 32 shown in FIG. 1. It is understood that a variety of module or inserts, such as a refuse bag, may also be disposed within opening 30 in base 16. It is also understood that the one or more accessory modules can be removable or rotatably attached so that access can be made to a storage area provided below the opening in the housing.

Referring now to FIGS. 2 and 3, one or more storage modules 34 are configured for releasable securement to the base 16. Storage modules 34 can take a variety of shapes, forms and sizes based on vehicle interior design needs and storage requirements. Further, the number of modules that can be removably secured to the base 16 can be defined based on vehicle interior requirements. For purposes of explanation, console assembly 10 includes a base 16 secured between a pair of passenger seats 12, 14 in the forward section of a vehicle interior having a first storage module 34 extending generally forward of the base 16 toward a front passenger seating area of the vehicle and a second storage module 36 extending generally rearward of the base 16.

The one or more storage modules 34 are releasably and reconfigurably positioned on the base 16 by a variety of methods. In one aspect of the invention shown in FIGS. 2 and 3, the one or more storage modules 34 include one or more projections 38 extending from a mounting surface 40 of the module housing 42. Projections 38 are configured to engage and releasably secure corresponding channels 44 in a side surface 26 of base 16. Projections 38 allow modules 34 to be cantilevered on base 16 to secure the modules 34 in position.

It is understood that a variety of fastening mechanisms and arrangements may be used with the present invention to accomplish the same objective. For example, the one or more projections may be provided at a variety of points on the side surfaces of the base that receive and engage corresponding apertures on the one or more storage modules. It is also understood that the one or more storage modules may be mounted to the base such that the modules are not removable. For example, the modules may be statically mounted in a single position. Alternatively, the one or more console modules may be hingedly secured to the base adjacent the upper end of the base such that one console module faces forward for use of the front seat occupants, the other console module rearward for the use of rear seat passengers.

Referring now to FIGS. 2 and 4-5, one or more trays 46 may be hingedly mounted to base 16 by hinges 48, thereby allowing the one or more trays to be pivoted between at least a first position extending generally parallel to the vehicle floor and perpendicular to the base 16 and a second or extended position wherein the trays extends generally perpendicular to the floor and parallel to the base 16. Each tray 46 may be used in the level position as a utility surface or can be raised for the storage and retrieval of large items.

For example, large items such as a purse, brief case, or the like, may be stored in a module secured to the base 16 as described above or placed in a fixed or removable storage unit 50 as illustrated in FIG. 4. Unit 50 could be sized to fit within support structure 20 to secure the unit 50 in position adjacent the base 16. In another aspect of the present invention shown in FIG. 5, an occupant accessory stored on support structure 20, such as cooler 52, purse 54 or the like beneath trays 46. As shown in the Figures, console assembly 10 generally includes a pair of trays 46 mounted on opposing surfaces of the base 16. It is also contemplated that the one or more trays may include a storage area or recess formed in a top surface of the tray that may be configured for storage of items therein.

Referring back to FIG. 3, the one or more storage modules 34 includes a housing a lower surface 56, front or face surface 58, an end or mounting surface 40 and a pair of opposing side surfaces 60 extending upward from the lower surface 56. A storage area 62 is formed by and between the housing surfaces. The storage area 62 may be generally accessed through a top surface 64 of the console module housing. It is understood that the console module housing may be configured to include a variety of storage compartments or areas, such as storage bins or cup holders. The storage area 62 is generally configured to receive and store a variety of personal items, including mobile telephones, sunglasses, purses, bags or the like. Storage area 62 may also be configured to receive electronic components or other passenger convenience devices.

Figure 6:
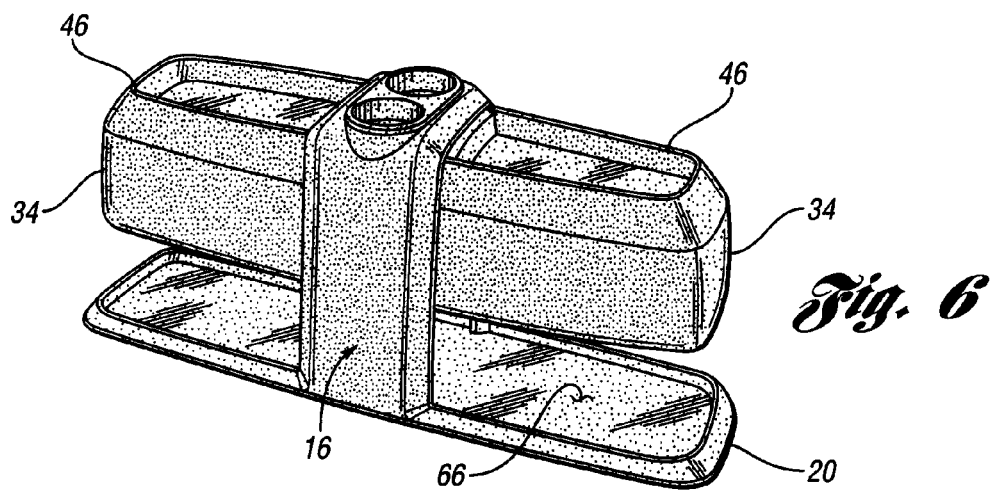
FIG. 6 is a perspective view of the console assembly with a pair of storage modules disposed below a pair of trays.

As shown in FIG. 6, it is contemplated that the one or more trays 46 will cooperate with the one or more storage modules 34, 36 to close out the storage area within modules 34, 36. In an alternative aspect of the present invention, the one or more storage modules may include a cover adjustably positioned relative to the top surface of the console module. The cover may be configured to act as an armrest which is positionable between a stowed position disposed at least partially adjacent the top surface of the console module and a deployed position. Storage modules 34, 36 shown in FIG. 6 are suspended above the support structure 20 or vehicle floor by base 16 such that a storage recess 66 below the modules 34.

Figure 7:
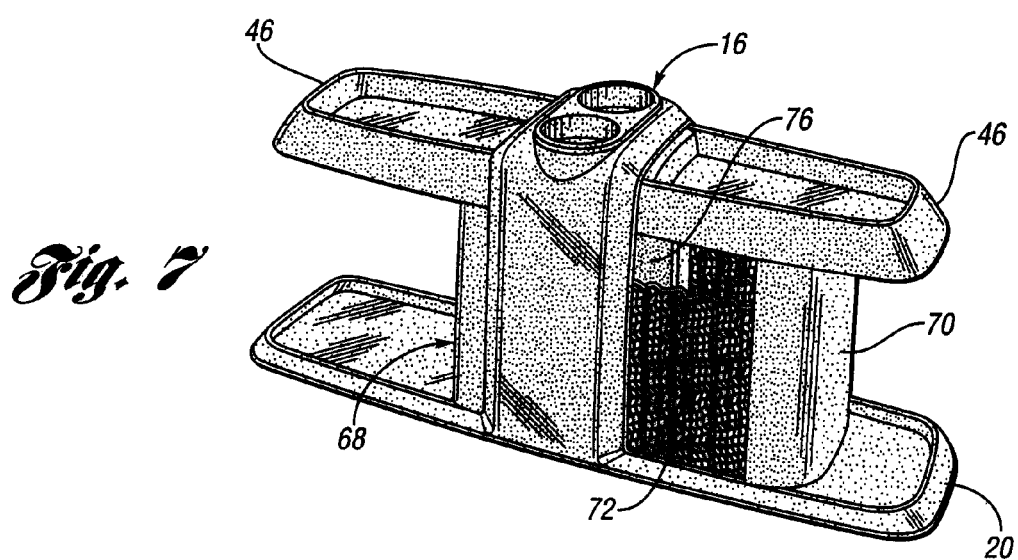
FIG. 7 is a perspective view of another aspect of the console assembly of the present invention.
Figure 8:
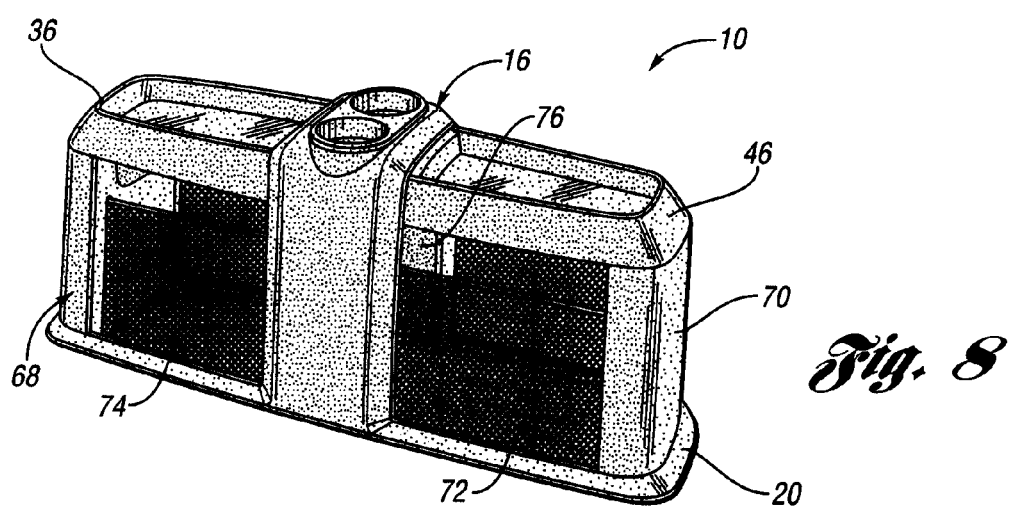
FIG. 8 is a perspective view of the console assembly shown in FIG. 7 with one more storage modules shown in an extended position in accordance with the present invention.

Referring now to FIGS. 7 and 8, another aspect of the console assembly 10 in accordance with the present invention is illustrated and disclosed. Console assembly 10 includes one or more storage modules configured for use with the base 16. One or more storage modules generally comprise extendable portions 68 movable relative to the base 16. Extendable portions 68 include an end surface 70 extending generally vertically from the vehicle floor or support structure 20 and a pair of retractable side pieces 72 attached at one end to the end surface 70 at the base 16 at the other end. Retractable side pieces 72 may be formed of any known material, such as polymeric mesh, fabric sleeve or the like.

FIG. 8 shows the extendable portions 68 in a deployed position. In this deployed position, end surfaces 70 cooperate with the one or more trays 46 and support structure 20 to enclose the forward and rearward ends of the console assembly 10. It is understood that end surfaces 70 may be connected to support structure 20 by one or more rails, allowing either automatic or manual positioning of the end surfaces by the vehicle occupants. Other positioning arrangements may also be used, such as inserting the end surfaces in cooperating channels formed in the support structure or by any other known arrangement.

Once the end surfaces 70 are extended to the forward and rearward ends of the support structure 20 of console assembly 10, retractable side pieces 72 are fully extended, thereby creating a storage area 74 between the end surfaces 70, side pieces 72, opening 76 in the base 16 and the trays 46 above. It is understood that the base may include an opening to create one storage area for both small and large items or alternatively, may be enclosed such that two distinct storage areas are formed. It is also understood that end surfaces 70 may be positioned at any interval distance away from base 16 and cooperate with the retractable side pieces 72 to form various sized storage areas.

In a stored position similar to that shown in FIG. 7, the end surfaces 70 of extendable portions 68 are disposed adjacent the base 16. The retractable side pieces 72 may be concealed in a variety of ways, such as disposed within the opening 76 in the base or retracted on spring-loaded rollers. This arrangement allows the vehicle occupants to choose the cargo management solution that best adapts to the storage requirements of the passenger compartment of the vehicle. These options can be made available at point of sale, or according to the model feature levels, or as dealer upgrades the vehicle based on user request.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A console assembly configured for use in a passenger seating area of a vehicle, the console assembly comprising:
   a base having a unitary structural support housing including a bottom surface securable to a floor of the passenger seating area, a top surface and a pair of opposing exterior side surfaces extending therebetween; and
   one or more trays, each of the one more trays being pivotally connected to an opposing exterior side surface of the unitary structural support housing of the base and movable between a first position extending generally parallel to the vehicle floor and at least one second position extending generally perpendicular to the floor, wherein the base and one or more trays cooperate to create a storage area therebetween.

2. The console assembly of claim 1 further comprising a support structure mounted to the vehicle floor cooperating with the bottom surface of the unitary structural supporting housing of the base and the one or more trays to create a storage area therebetween.

3. The console assembly of claim 1 further comprising one or more storage modules disposed adjacent to the base to provide additional storage in the passenger seating area, the one or more console modules including a housing having a storage area defined therein.

4. The console assembly of claim 3 wherein the housing of each of the one or more storage modules is removably secured to one of the opposing exterior side surfaces of the unitary structural support housing of the base and cooperates with the one or more trays to enclose the storage area therebetween.

5. The console assembly of claim 3 wherein the one or more storage modules comprise an end surface extending generally vertically to the floor and a pair of retractable side pieces attached at one end to the end surface and the base at the other end to form a storage area between the end surface and side pieces.

6. The console assembly of claim 3 wherein the housing of each of the one or more storage modules comprises a lower surface, a face surface, a mounting surface and a pair of opposing side surfaces each extending upward from the base and cooperating with each other to form the storage area therebetween, wherein the mounting surface of the housing of the one or more storage modules is releasably secured to one of the opposing exterior side surfaces of the unitary structural support housing of the base.

7. The console assembly of claim 6 wherein the mounting surface of the housing of the one or more storage modules includes one or more projections that are configured to engage and releasably secure one or more channels on the opposing exterior side surfaces of the unitary structural support housing of the base.

8. The console assembly of claim 6 wherein the top surface of the housing of each of the one or more storage modules is disposed adjacent the one or more trays on the opposing exterior side surfaces of the unitary structural support housing of the base when the housing is releasably secured to one of the corresponding exterior side surfaces of the base such that the one or more trays cooperate to cover and enclose the storage area in the one or more storage modules.

9. The console assembly of claim 6 wherein the one or more storage modules further comprises a cover connected to the console module housing that is adjustably positionable between a stowed position disposed at least partially adjacent a top surface of the console module housing and a deployed position.

10. The console assembly of claim 1 wherein the top surface of the housing of the base further comprises an opening configured to receive an accessory therein.

11. The console assembly of claim 10 wherein a cup holder is configured for mounting in the opening formed in the top surface of the base.

12. The console assembly of claim 1 wherein the one or more trays further comprise a storage area formed in a top surface of the tray configured for storage of items therein.

13. A console assembly for use with a passenger seating area of a vehicle, the console assembly comprising:
    a base having a unitary structural support housing including a bottom surface securable to a floor of the passenger seating area, a top surface and a pair of opposing exterior side surfaces extending therebetween; and
    a support structure mounted to the vehicle floor cooperating with the bottom surface of the base;
    first and second storage modules configured for releasable securement to opposing exterior side surfaces of the unitary structural support housing of the base, the one or more modules including a housing having a storage area defined therein to provide additional storage in the passenger seating area; and
    first and second trays pivotally connected to the opposing exterior side surfaces of the unitary structural support housing of the base and disposed adjacent a top surface of the first and second storage modules movable between a first position extending generally parallel to the vehicle floor and at least one second position extending generally perpendicular to the floor.

14. The console assembly of claim 13 wherein the housing of the first and second storage modules each include a lower surface, a face surface, a mounting surface and a pair of opposing side surfaces each extending upward from the lower surface and cooperating with each other to form the storage area therebetween.

15. The console assembly of claim 14 wherein the mounting surface of the housing of the first and second storage modules includes one or more projections that are configured to engage and releasably secure one or more channels on the opposing exterior side surfaces of the unitary structural support housing of the base.

16. The console assembly of claim 13 wherein the top surface of the base further comprises an opening configured to receive an accessory therein.

17. The console assembly of claim 16 wherein a cup holder is configured for mounting in the opening formed in the top surface of the base.

18. A console assembly for use with a passenger seating area of a vehicle, the console assembly comprising:
    a base securable to a floor of the passenger seating area;
    a support structure mounted to the vehicle floor cooperating with the base;
    a pair of storage modules positioned adjacent to and configured to be movably positioned on the support structure to define a storage area therein to provide additional storage in the passenger seating area, the pair of storage modules each having an end surface extending generally vertically to the floor and a pair of retractable side pieces attached at one end to the end surface and the base at the other end to form a storage area between the end surface, side pieces and a pair of opposing trays mounted on the base above the pair of modules; and a pair of trays pivotally connected to the base adjacent the pair of storage modules movable between a first position extending generally parallel to the vehicle floor and at least one second position extending generally perpendicular to the floor.

19. The console assembly of claim 18 wherein the pair of storage modules further comprise a pair of modules disposed on opposing sides of the base.

20. The console assembly of claim 2 wherein the one or more trays further comprise first and second trays pivotally connected on the opposing exterior side surfaces of the unitary structural support housing of the base and extending above the support structure mounted to the vehicle floor.

* * * * *